No. 738,606. Patented September 8, 1903.

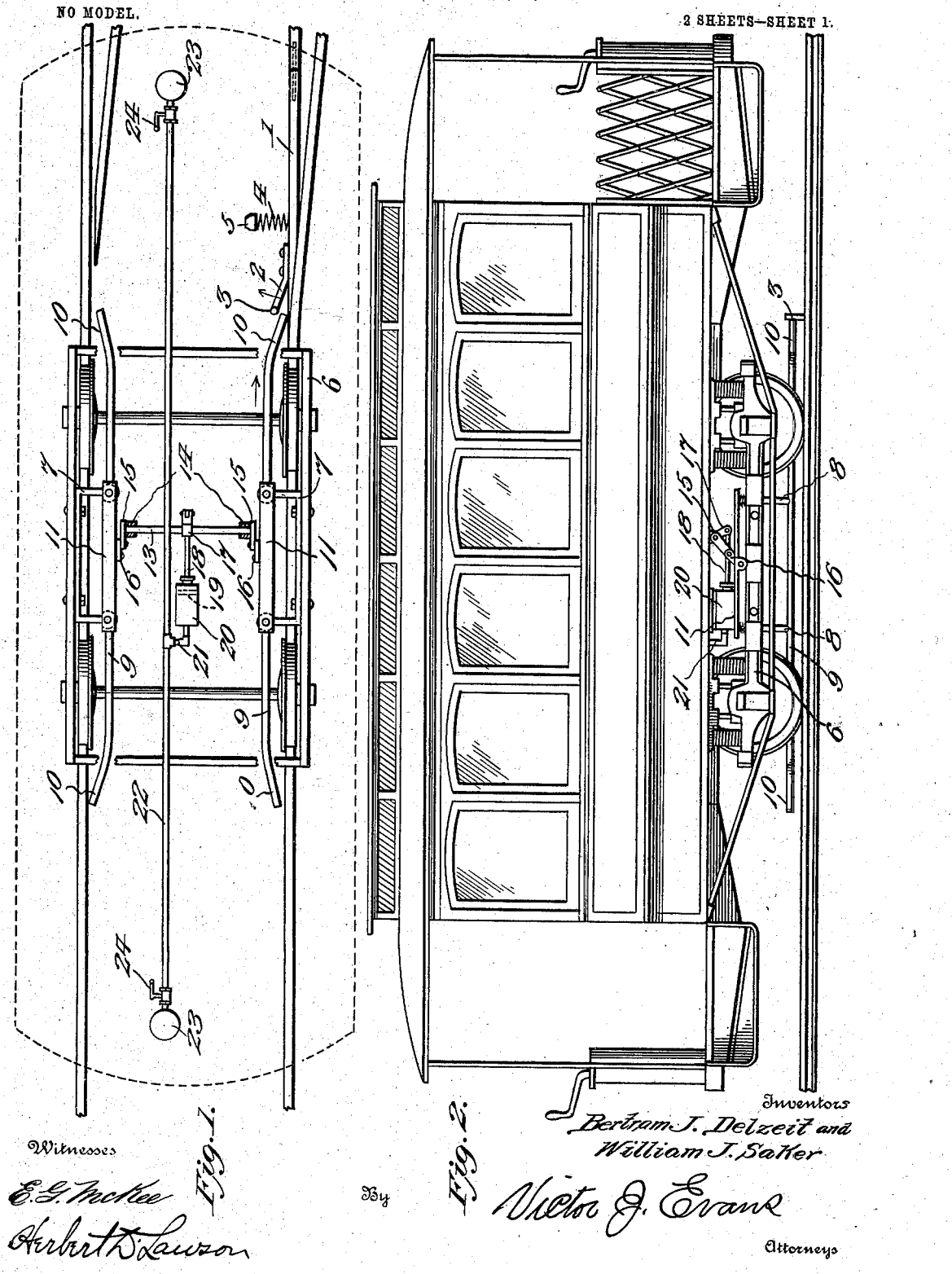

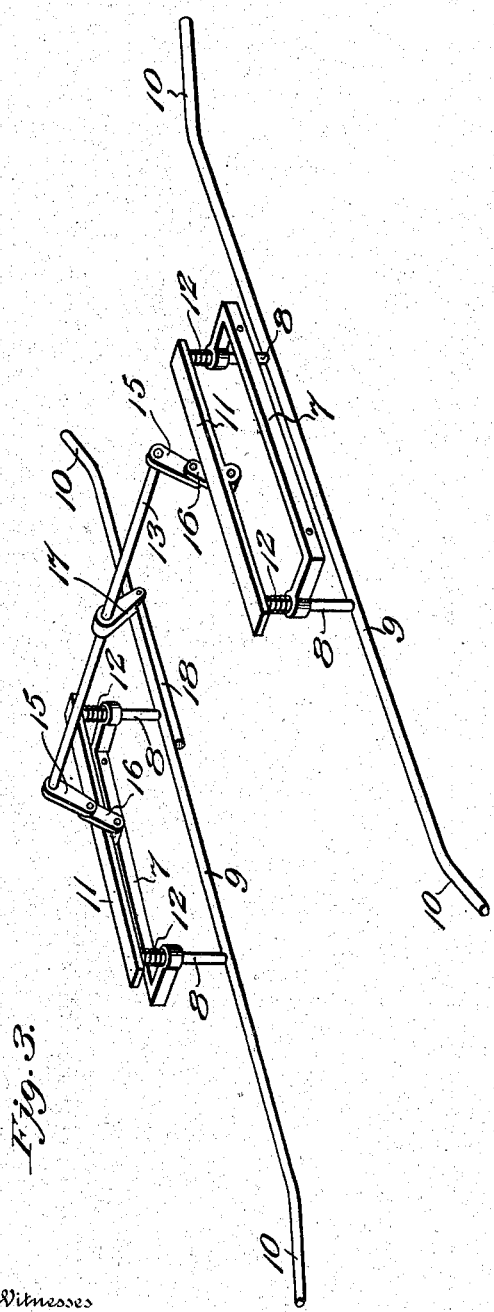
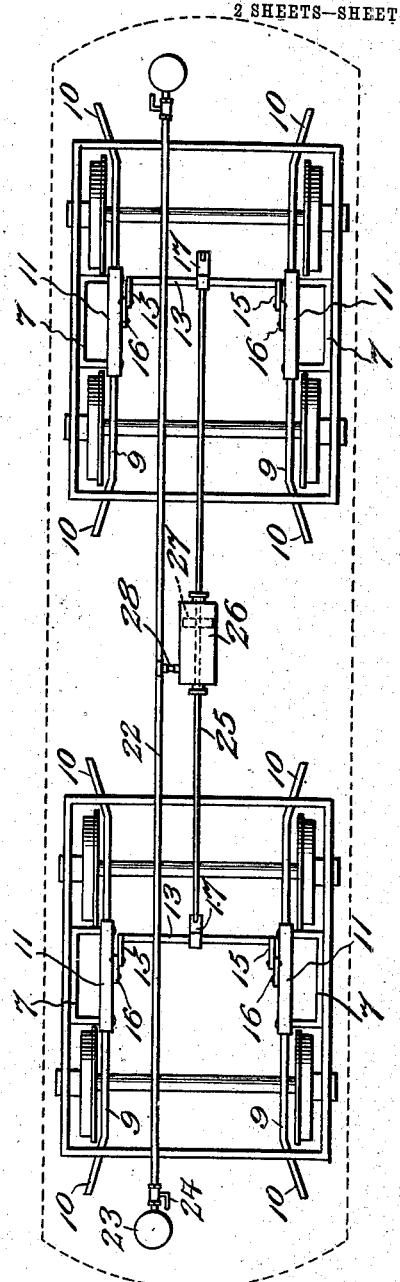

UNITED STATES PATENT OFFICE.

BERTRAM J. DELZEIT AND WILLIAM J. SAKER, OF PHILADELPHIA, PENNSYLVANIA.

SWITCH-OPERATING MECHANISM.

SPECIFICATION forming part of Letters Patent No. 738,606, dated September 8, 1903.

Application filed February 18, 1903. Serial No. 143,966. (No model.)

*To all whom it may concern:*

Be it known that we, BERTRAM J. DELZEIT and WILLIAM J. SAKER, citizens of the United States, residing at Philadelphia, in the county of Philadelphia and State of Pennsylvania, have invented new and useful Improvements in Switch-Operating Mechanism, of which the following is a specification.

This invention relates to new and useful improvements in switch-operating mechanism for use upon cars; and its object is to provide a simple and inexpensive device which may be readily attached to railway-cars of ordinary construction and by means of which the tongue of a switch can be shifted in a desired direction by the car approaching the same.

The invention consists in arranging shifting rails at each side of the truck of the car, and these rails are adapted to be moved from or toward the track by means of suitable mechanism located upon the car and in control of the person operating the car. The shifting rails are adapted when lowered to come into contact with arms connected to and extending upward from the tongue of a switch and swing said tongue laterally upon its fulcrum and hold it in such position until the truck of the car has passed thereover.

The invention also consists in the further novel construction and combination of parts hereinafter more fully described and claimed and illustrated in the accompanying drawings, showing the preferred form of our invention, and in which—

Figure 1 is a plan view of a car-truck in position upon a track and showing the tongue-shifting mechanism connected thereto. Fig. 2 is a side elevation of a car having our improved attachment thereon. Fig. 3 is a detail view of the shifting device detached, and Fig. 4 is a plan view of double trucks of a car and showing the means for operating the shifting rails upon the trucks in unison.

Referring to the figures by numerals of reference, 1 is the tongue of a switch, and to the inner face thereof adjacent to its free end is bolted or otherwise secured an arm 2, having an upwardly-extending lug 3. This arm projects from the tongue at an angle thereto. The tongue is held normally in position against the adjacent rail of the track by means of a coiled spring 4, the outer end of which abuts against a stationary block 5 or any other suitable device for preventing displacement of the spring.

The means for operating the tongue is located upon the truck 6 of a car and comprises brackets 7, secured to and extending inwardly from opposite sides of the truck and having vertical arms 8 slidably mounted therein. The arms 8 at each side of the truck are connected to a shifting rail 9, the ends 10 of which extend outward at angles. The upper ends of each pair of arms 8 are connected by a strip 11, and preferably coiled springs 12 are arranged on the arms and interposed between this strip and the bracket 7. A shaft 13 is journaled in hangers 14, depending from the bottom of the car, and is provided at its ends with cranks 15, which are connected by means of links 16 to the centers of the strips 11, before referred to. An arm 17 is secured to the shaft 13 and extends downward therefrom and is connected by means of a rod 18 to a piston 19, slidably mounted within a cylinder 20, which is suitably secured to the bottom of the car. A pipe 21 extends from one end of the cylinder and is connected to a pipe 22, projecting from one end to the other of the car and communicating with tanks 23 for holding compressed air. A valve 24 is located within the pipe 22, adjacent to each tank 23 at a point within easy reach of the operator upon the car.

When a car approaches the switch and it is desired to shift the tongue so as to permit said car to travel upon the siding, one of the valves 24 is turned so as to admit the compressed air into cylinder 20 by way of pipes 22 and 21. Piston 19 will be promptly forced longitudinally within cylinder 20 and cause arms 17 to swing and partly revolve shaft 13. This movement of the shaft will force the strips 11, arms 8, and shifting rails 9 downward, and at the same time springs 12 will be compressed. When the rails 9 are in lowered position, one of them is adapted upon approaching the switch to contact with the lug 3, connected to the tongue 1, and said lug and tongue will be forced laterally by the inclined end of said rail and will be held in such position until said rail passes the lug, at which time the spring 4, which has been compressed by the laterally-moving tongue, will return the tongue to normal position. The rails 9 are of greater length than the truck to which they are secured, and therefore it is obvious that the tongue will be held open until all the wheels upon the truck have passed onto the siding. After the switch has been passed the valve 24 is closed, and said valve may be so constructed as to act as an exhaust for the air which has been forced into the cylinder 20 and pipes 21 and 22. As soon as the air passes from these portions of the apparatus the springs 12 will return the rails 9 and the parts connected thereto to normal position.

When two trucks are arranged upon one car, each of them will be provided whith shifting rails, such as hereinbefore described, and in order that both pairs of rails may be operated in unison we connect the arms 17 of the two shafts 13 by means of the rod 25, which extends through a cylinder 26 and has a piston 27 connected thereto and slidably mounted within said cylinder. A pipe 28 is provided for conducting compressed air from the pipe 22 into the cylinder 26. It will be obvious that when air is admitted to the cylinder both pairs of shifting rails will be operated in unison during the longitudinal movement of the rod 25, connected to piston 27.

We do not wish to limit ourselves to the use of compressed air for operating the mechanism herein described, as any other suitable power may be employed in lieu thereof.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus described the invention, what is claimed as new is—

1. The combination with a truck having brackets secured to and extending inward from the sides thereof; of a pair of arms mounted within each bracket, a rail secured to each pair of arms and having outwardly-extending ends, strips connecting the arms of each pair, a rotary shaft, cranks upon the shaft, links connecting said cranks and strips, and means for rotating the shaft whereby the arms and the rails connected thereto are moved downward from the truck.

2. The combination with a truck having brackets secured to and extending inward from the sides thereof; of a pair of arms slidably mounted within each bracket, a rail connecting the lower ends of each pair of arms and having outwardly-extending ends, a strip connecting the upper ends of each pair of arms, springs upon the arms and interposed between the brackets and strips, a transversely-extending shaft, cranks at the ends thereof, and a link connection between said cranks and strips whereby downward movement may be imparted to the rails from the shaft.

3. The combination with a truck having inwardly-extending brackets secured to the sides thereof; of a pair of vertical arms slidably mounted within each of the brackets, a shifting rail connecting the lower ends of each pair of arms and having outwardly-extending ends, a strip connecting the upper ends of each pair of arms, springs upon the arms and interposed between the brackets and strips, a revoluble shaft, cranks at the ends thereof, link connections between said cranks and the strips, an arm upon the shaft, and means for partly rotating said arm and shaft whereby downward motion may be imparted to the shifting rails.

4. The combination with a truck having inwardly-extending brackets secured to the sides thereof; of a pair of vertical arms slidably mounted within each of the brackets, a shifting rail connecting the lower ends of each pair of arms and having outwardly-extending ends, a strip connecting the upper ends of each pair of arms, springs upon the arms and interposed between the brackets and strips, a revoluble shaft, cranks at the ends thereof, link connections between said cranks and the strips, an arm upon the shafts, a cylinder, a tank, a valved connection between said tank and cylinder, a piston within the cylinder, and a rod connecting said piston and the arm of the shaft.

5. The combination with a spring-pressed switch, and a tongue having an upwardly-extending lug connected thereto; of operating mechanism comprising brackets, vertical arms slidably mounted within the brackets, shifting rails connected to the arms and having outwardly-extending ends adapted to be brought into contact with the lug, strips connecting the arms, springs upon the arms and interposed between the brackets and strips, a shaft, cranks at the ends thereof, links connecting said cranks and the strips, a tank, a cylinder, a valved connection between said tank and cylinder, a piston within the cylinder, a rod extending therefrom, and an arm upon the shaft connected to the rod.

In testimony whereof we affix our signatures in presence of two witnesses.

BERTRAM J. DELZEIT.
WILLIAM J. SAKER.

Witnesses:
SUSAN McCAREY,
JAMES McCAREY.